(12) United States Patent
Kryder et al.

(10) Patent No.: US 9,076,476 B2
(45) Date of Patent: Jul. 7, 2015

(54) THIN FILM MEDIA STRUCTURE FOR PERPENDICULAR MAGNETIC RECORDING AND STORAGE DEVICES MADE THEREWITH

(71) Applicant: Carnegie Mellon University, Pittsburgh, PA (US)

(72) Inventors: Mark Kryder, Northeast Harbor, ME (US); Steven D. Granz, Bloomington, MN (US); Katayun Barmak Vaziri, White Plains, NY (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/346,247

(22) PCT Filed: Sep. 21, 2012

(86) PCT No.: PCT/US2012/056712
§ 371 (c)(1),
(2) Date: Mar. 20, 2014

(87) PCT Pub. No.: WO2013/044133
PCT Pub. Date: Mar. 28, 2013

(65) Prior Publication Data
US 2014/0233363 A1  Aug. 21, 2014

Related U.S. Application Data

(60) Provisional application No. 61/626,335, filed on Sep. 23, 2011, provisional application No. 61/685,927, filed on Mar. 27, 2012.

(51) Int. Cl.
G11B 5/66 (2006.01)
G11B 5/65 (2006.01)
(Continued)

(52) U.S. Cl.
CPC ............ *G11B 5/653* (2013.01); *G11B 5/70615* (2013.01); *G11B 5/70626* (2013.01); *G11B 5/738* (2013.01); *G11B 5/746* (2013.01)

(58) Field of Classification Search
None
See application file for complete search history.

(56) References Cited

U.S. PATENT DOCUMENTS 8,173,282 B1 * 5/2012 Sun et al. ............... 428/831
8,268,462 B2 * 9/2012 Peng et al. ............. 428/836.2
(Continued)

FOREIGN PATENT DOCUMENTS

JP   2008108395 A    5/2008

OTHER PUBLICATIONS

Luo et al., Applied Physics Letters, vol. 77, No. 14, Oct. 2000, pp. 2225-2227.*
(Continued)

*Primary Examiner* — Holly Rickman
(74) *Attorney, Agent, or Firm* — Downs Rachlin Martin PLLC (57) ABSTRACT

Iron-platinum (FePt) based magnetic recording media structures that provide small grain size and isolated-grain configurations suitable for high-density magnetic recording. In one of the structures, the recording media structure includes a thin film containing grains of $L1_0$ FePt and boron as a segregant contained in intergranular regions located among the FePt grains. In another structure, the recording media structure includes a thin film containing grains of $L1_0$ FePt, wherein the film is formed on an underlayer containing at least one material selected to control the size of the FePt grains in the film. Proper choices of materials, relative amounts of the materials, processing parameters, and other variables permit these structures to be formed with grain sizes, magnetization orientations, and perpendicular coercivities that allow designers to create magnetic storage devices having storage densities of 1 $Tbit/in^2$ and greater.

44 Claims, 5 Drawing Sheets

(51) Int. Cl.
*G11B 5/706* (2006.01)
*G11B 5/738* (2006.01)
*G11B 5/74* (2006.01)

(56) References Cited

U.S. PATENT DOCUMENTS

| | | | |
|---|---|---|---|
| 8,563,148 B2 * | 10/2013 | Hayakawa et al. | 428/840.4 |
| 2001/0036562 A1 * | 11/2001 | Sellmyer et al. | 428/694 T |
| 2006/0121319 A1 | 6/2006 | Wu et al. | |
| 2006/0154110 A1 | 7/2006 | Hohlfeld et al. | |
| 2008/0131735 A1 | 6/2008 | Das et al. | |

OTHER PUBLICATIONS

Yang et al., Journal of Applied Physics, vol. 102(10610), Nov. 2007, pp. 1-3.*

Yan et al., Journal of Applied Physics, vol. 91, No. 10, May 2002, pp. 8471-8473.*

International Search Report and Written Opinion dated Dec. 27, 2012, in connection with related PCT/US2012/056712 filed Sep. 21, 2012.

* cited by examiner

| Temperature (°C) | B (vol%) | Ag (vol%) | Pressure (mtorr) | Power (watts) | Order Parameter | $H_c$ (Oe) | Grain Size (nm) | Center to Center (nm) | Teragrains per Inch$^2$ |
|---|---|---|---|---|---|---|---|---|---|
| 24 | 15 | 0 | 40 | 75 | 0.00 | 50 | 2.5 | 3.1 | 84.14 |
| 425 | 0 | 0 | 25 | 100 | 0.88 | 6300 | 32.4 | 32.6 | 0.8 |
| 425 | 10 | 0 | 25 | 100 | 0.41 | 500 | 9.5 | 10.5 | 7.5 |
| 425 | 20 | 0 | 25 | 100 | 0.39 | 500 | 7.6 | 8.7 | 10.8 |
| 575 | 0 | 0 | 25 | 100 | 0.95 | 15000 | 121 | 146 | 0.04 |
| 575 | 10 | 0 | 25 | 100 | 0.66 | 5000 | 29.2 | 36.4 | 0.6 |
| 575 | 20 | 0 | 25 | 100 | 0.81 | 10000 | 16.5 | 19.6 | 2.2 |
| 575 | 30 | 0 | 25 | 100 | 0.89 | 13000 | 13.8 | 16.5 | 3.01 |
| 575 | 40 | 0 | 25 | 100 | 0.45 | 1000 | 10.1 | 10.9 | 6.9 |
| 450 | 10 | 0 | 25 | 100 | 0.47 | 1900 | 12.3 | 13.3 | 4.7 |
| 450 | 15 | 0 | 25 | 100 | 0.65 | 4100 | 9.1 | 10.7 | 7.2 |
| 450 | 20 | 0 | 25 | 100 | 0.51 | 2500 | 6.6 | 7.8 | 13.4 |
| 450 | 15 | 0 | 10 | 25 | 0.33 | 200 | 4.2 | 5.1 | 31.5 |
| 450 | 15 | 0 | 10 | 50 | 0.36 | 350 | 6.3 | 7.3 | 15.5 |
| 450 | 15 | 0 | 10 | 100 | 0.42 | 500 | 7.2 | 8.1 | 12.5 |
| 450 | 15 | 0 | 10 | 200 | 0.44 | 1000 | 12.4 | 14.3 | 4.0 |
| 450 | 15 | 0 | 40 | 25 | 0.43 | 500 | 6 | 6.9 | 17.0 |
| 450 | 15 | 0 | 40 | 50 | 0.57 | 3000 | 6.6 | 7.7 | 13.9 |
| 450 | 15 | 0 | 40 | 75 | 0.76 | 7000 | 6.9 | 7.8 | 13.4 |
| 450 | 15 | 0 | 40 | 100 | 0.73 | 6000 | 7.4 | 8.5 | 11.4 |
| 450 | 15 | 0 | 40 | 150 | 0.67 | 5500 | 7.5 | 8.7 | 10.8 |
| 450 | 15 | 0 | 40 | 200 | 0.46 | 1700 | 6.9 | 8.1 | 12.7 |
| 450 | 14 | 4 | 40 | 75 | 0.76 | 7200 | 7.1 | 7.9 | 13.2 |
| 450 | 13 | 5 | 40 | 75 | 0.86 | 11000 | 7 | 7.9 | 13.2 |
| 450 | 11 | 8 | 40 | 75 | 0.78 | 7800 | 6.9 | 7.8 | 13.4 |
| 450 | 10 | 11 | 40 | 75 | 0.75 | 6400 | 7.1 | 7.9 | 13.2 |

THIN FILM MEDIA STRUCTURE FOR PERPENDICULAR MAGNETIC RECORDING AND STORAGE DEVICES MADE THEREWITH

RELATED APPLICATION DATA

This application claims the benefit of priority of U.S. Provisional Patent Application Ser. No. 61/626,335, filed on Sep. 23, 2011, and titled "Thin Film Media Structure for Perpendicular Magnetic Recording." This application also claims the benefit of priority of U.S. Provisional Patent Application Ser. No. 61/685,927, filed on Mar. 27, 2012, and titled "Underlayer to Control the Grain Size of Perpendicular Recording Media." Each of these applications is incorporated by reference herein in its entirety.

FIELD OF THE INVENTION

The present invention generally relates to the field of information storage devices. In particular, the present invention is directed to thin-film media structures for perpendicular magnetic recording, and storage devices made therewith.

BACKGROUND

As the demand for higher densities of magnetic data recording has increased, the areal density of recording is being limited by conventional cobalt-alloy media, which are reaching a fundamental limit due to thermal instabilities. To further increase the density, it is necessary to increase the magnetic anisotropy, to reduce the media grain size and variance, and to magnetically decouple the grains. For the grains to be thermally stable for 10 years, the ratio of $K_u V$ to $k_b T$ must be greater than 40, wherein $K_u$ is the magnetic anisotropy constant, V is the grain volume, and $K_b T$ is the thermal energy. In order to maintain the signal-to-noise ratio, as the areal density increases, the volume of the grain must decrease. However, for smaller grains to remain thermally stable, a magnetic material with a higher $K_u$ must be used to prevent super-paramagnetism. On the other hand, the maximum $K_u$ that may be used with conventional read/write heads is limited, because the maximum field that can be produced by a magnetic recording head is limited by the saturation flux density of the head material. This limitation has recently caused considerable interest in bit-patterned magnetic recording (BPMR) and heat-assisted magnetic recording (HAMR), in which heat generated by a laser is used to heat the media and lower the magnetic anisotropy momentarily during the write process, making it possible to write a high anisotropy medium.

A very promising magnetic media candidate for BPMR and HAMR is $L1_0$ iron-platinum (FePt), which has a high bulk magnetocrystalline anisotropy energy constant $K_u$ of $\sim 7 \times 10^7$ ergs/cc and is relatively corrosion resistant. At room temperature, grain sizes as small as 3 nm could, in theory, be thermally stable in FePt. If such small grains could be fabricated and written, the areal density that FePt media could support is well beyond 1 Tbit/in$^2$.

Although high anisotropy $L1_0$ FePt thin films have attracted significant research attention for the past decade, no one has reported the ability to make well-ordered $L1_0$ FePt films with columnar grain structure and perpendicular texture (i.e., preferred crystal orientation of grains wherein the crystal axis along which the magnetic easy axis lies is perpendicular to the substrate), well-isolated grains, small grain size, and high coercivity, all of which are needed simultaneously in order to achieve HAMR at densities beyond 1 Tbit/in$^2$.

SUMMARY OF THE DISCLOSURE

In one implementation, the present disclosure is directed to a magnetic recording medium. The magnetic recording medium includes a substrate having a surface; and a magnetically recordable layer supported by the substrate, the magnetically recordable layer having a coercivity of at least about 5 kOe and including iron-platinum having a granular configuration comprising grains separated by inter-granular regions, wherein the grains have predominantly a $L1_0$ crystal structure; have an average grain size of between about 2 nm and about 10 nm in a plane parallel to the surface of the substrate; and a magnetization orientation substantially perpendicular to the surface of the substrate; and boron interspersed among the grains, wherein the boron comprises about 5% to about 40% of the magnetically recordable layer, by volume.

In another implementation, the present disclosure is directed to a magnetic recording medium. The magnetic recording medium includes a substrate having a surface, a magnetically recordable layer supported by the substrate, the magnetically recordable layer having a coercivity of at least about 5 kOe and including iron-platinum having a granular configuration comprising grains separated by inter-granular regions wherein the grains have a predominantly $L1_0$ crystal structure; have an average grain size of between about 2 nm and about 10 nm in a plane parallel to the surface of the substrate; and a magnetization orientation substantially perpendicular to the surface of the substrate; and an underlayer disposed between the magnetically recordable layer and the substrate so as to be in contact with the iron-platinum, wherein the underlayer comprises a material selected to influence the grain size of the grains of the iron-platinum as the magnetically recordable layer is grown over the underlayer.

In still another implementation, the present disclosure is directed to an information storage device. The information storage device includes a substrate comprising a support and having a surface; and a magnetic storage medium supported by the support and including a magnetically recordable layer supported by the substrate, the magnetically recordable layer having a coercivity of at least about 5 kOe and including iron-platinum having a granular configuration comprising grains separated by inter-granular regions, wherein the grains have a predominantly $L1_0$ crystal structure; have an average grain size of between about 2 nm and about 10 nm in a plane parallel to the surface of the substrate; and a magnetization orientation substantially perpendicular to the surface of the substrate; and boron interspersed among the grains, wherein the boron comprises about 5% to about 40% of the magnetically recordable layer, by volume.

In yet another implementation, the present disclosure is directed to an information storage device. The information storage device includes a substrate comprising a support and having a surface; and a magnetic storage medium supported by the support and including a magnetically recordable layer supported by the substrate, the magnetically recordable layer having a coercivity of at least about 5 kOe and including iron-platinum having a predominantly granular configuration comprising grains separated by inter-granular regions wherein the grains have an $L1_0$ crystal structure; have an average grain size of between about 2 nm and about 10 nm in a plane parallel to the surface of the substrate; and a magnetization orientation substantially perpendicular to the surface of the substrate; and an underlayer disposed between the magnetically recordable layer and the substrate so as to be in contact with the iron-platinum, wherein the underlayer comprises a material selected to influence the grain size of the grains of the iron-platinum as the magnetically recordable layer is grown over the underlayer.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present invention are directed to magnetic recording media structures that will allow data storage densities to exceed 1 Tbit/in$^2$, especially in conjunction with techniques for heat-assisted magnetic recording. More particularly, magnetic recording media structures disclosed herein include magnetically recordable films that have a confluence of properties and characteristics that allow for such high storage densities, but heretofore have been extremely difficult to achieve. These properties and characteristics include: perpendicular (columnar) grain orientation relative to the substrates on which the films are grown, small average grain size (e.g., on the order of about 2 nm to about 10 nm); and have high coercivities (e.g., equal to or greater than 5 kOe). Other aspects of the present invention are directed to making such magnetic recording media structures, as well as to embodying such magnetic recording media structures into information-storage devices. These and other aspects and features of the present invention are described below in detail.

Figure 1A:
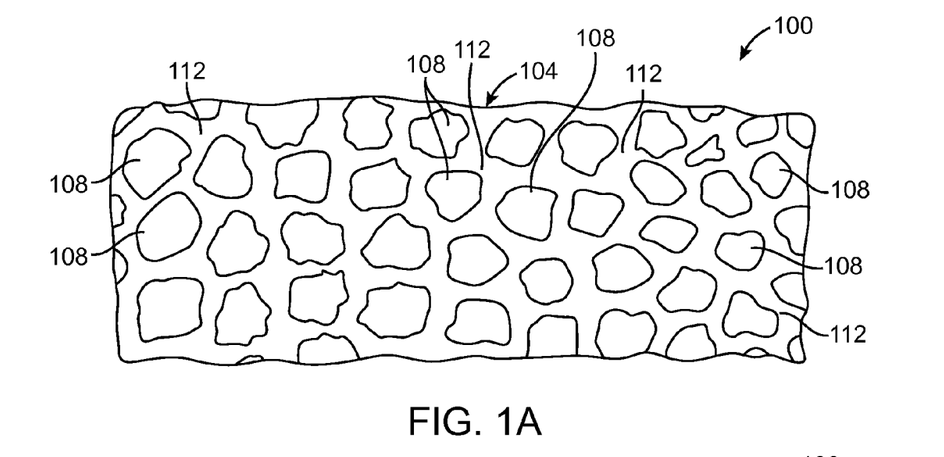
FIG. 1A is a representational plan view of an FePt-based magnetic storage medium structure made in accordance with the present invention.
Figure 1B:
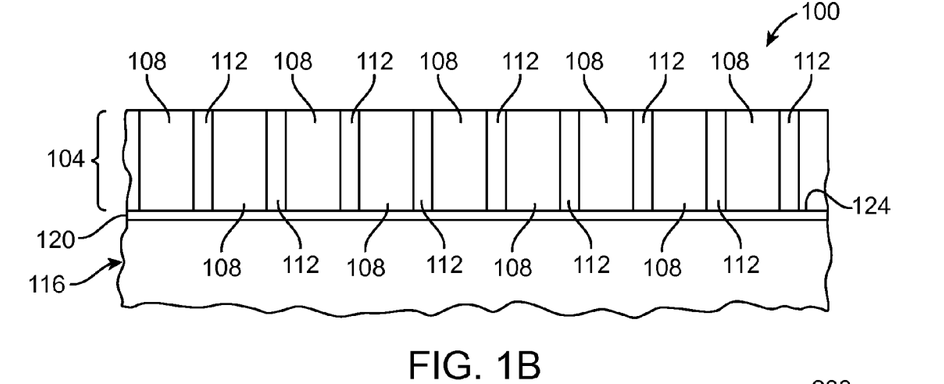
FIG. 1B is representational cross-sectional view of the magnetic storage medium structure of FIG. 1A.

Referring to FIGS. 1A and 1B, these figures illustrate a magnetic storage medium structure 100 that is based on iron-platinum (FePt) as the magnetic material and further includes boron (B) to create an FePt—B:X film 104. (It is noted that X can be one or more additional materials or, alternatively, the absence of any additional material.) The general structure of FePt—B:X film 104 is that it comprises a plurality of largely regular grains 108 (only a few are labeled for convenience) of $L1_0$ FePt separated by intergranular regions 112, which contain at least the boron as a segregant and can contain one or more other segregants and/or other materials, as indicated by the "X" in the "FePt—B:X" designation. Depending on a number of factors, including material used along with the FePt, the relative amounts of the materials, and the processing parameters used to create FePt—B:X film 104, the structure and magnetic properties of the FePt—B:X film can be controlled to produce the confluence of properties and characteristics, mentioned above, that are desired/needed for creating high-density magnetic storage devices, i.e., storage devices that include magnetically recordable layers having 1 Tbit/in$^2$ or greater storage densities.

In this example, FePt—B:X film 104 has been grown on a substrate 116 that includes a texturing material 120 that promotes $L1_0$ ordering of the FePt in the FePt—B:X film. Examples of materials suitable for texturing material 120 include but are not limited to MgO, TiN, Ag, Pt, CrRu, CrMo, and RuAl, among others. Further details of texturing material 120, the providing of same, and the depositing of FePt on such material are not required, as these are known in the art. Substrate 116 may also include a wafer, such as a silicon wafer, glass or aluminum disk, or other structure, as needed, to support texturing material 120. Grains 108 of the FePt are oriented perpendicularly in a columnar fashion relative to the surface 124 of substrate 116 so as to create the perpendicular recording structure of FePt—B:X film 104. It is noted that while grains 108 in this example are columnar, it is possible that one could make non-columnar small grains and still provide the functionality required. FePt—B:X film 104 may have any suitable thickness, such as from about 0.2 nm to about 20 nm, and can be formed using any suitable processing techniques. When FePt—B:X film 104 is made using sputtering techniques, it can be formed by sequentially depositing multiple sublayers of the differing materials used, by co-sputtering the materials simultaneously, by sputtering from a composite target, or by any suitable combination of these. As an example of sequential sputtering, when FePt—B:X film 104 contains essentially only FePt and boron, 10 separate sublayers of each can be formed by alternately sputtering the FePt and the boron, for a total of 20 sublayers.

As mentioned above, desirable average sizes of grains 108 of the FePt are from about 2 nm to about 10 nm, and average center-to-center distances from grain to grain are desirable to be on the order of about 3 nm to about 12 nm. Intergranular regions 112 provide, among other things, magnetic isolation between immediately adjacent grains and are where the boron and any other additional materials largely reside. Examples of materials other than boron that may be beneficial to add to FePt—B:X layer 104 to affect grain size and ordering include Ag, C, SiOx, and TaOx, among others. The present inventors have found that the amount of boron present in FePt—B:X film 104 can affect the size and ordering of grains 108. Generally, a range of volumetric content of boron, relative to the film, of about 5% to about 40%, provides desirable results, while boron content of about 5% to about 15% appears to produce the most desirable results for grain size and ordering.

Figure 2:
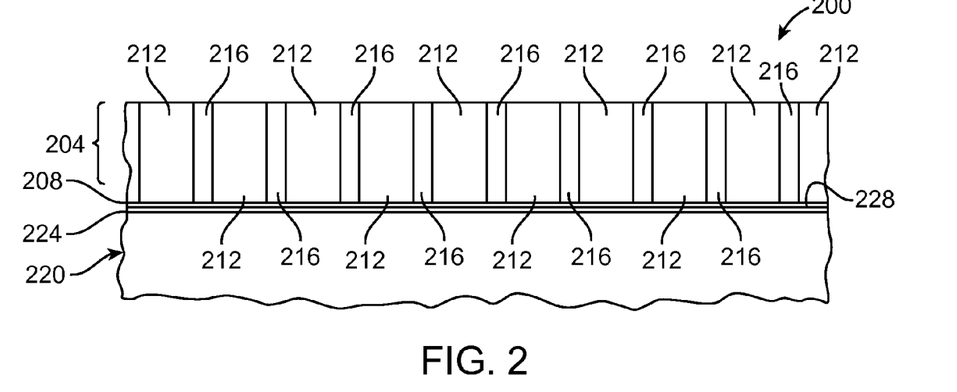
FIG. 2 is representational cross-sectional view of an alternative magnetic storage medium structure that can be used to create the general grain structure illustrated in FIG. 1A.

FIG. 2 illustrates another magnetic storage medium structure 200 that is based on iron-platinum (FePt). In this example, structure 200 includes an FePt:X film 204 that is deposited onto an underlayer 208 containing one or more materials selected to control the size of grains 212 in the FePt:X film. As with FePt—B:X film 104 of FIGS. 1A and 1B, FePt:X film 204 of FIG. 2 has a general structure that comprises a plurality of largely regular grains 212 (only a few are labeled for convenience) of $L1_0$ FePt separated by intergranular regions 216, which contain at least one segregant and can contain one or more other materials. As those skilled in the art will readily appreciate, when viewed in the manner of the view of FIG. 1A, structure 200 of FIG. 2 can be identical in grain structure to the grain structure illustrated in FIG. 1A.

Referring again to structure 200 of FIG. 2, in this example the "X" in the "FePt:X" designation indicates both one or more segregants and one or more optional additional materials that can be present in intergranular regions 216. Depending on a number of factors, including material used along with the FePt, the relative amounts of the materials in FePt:X film 204, the processing parameters used to create FePt:X film 204, and the material(s) and its/their amount(s) in underlayer 208, the structure and magnetic properties of the FePt:X film can be controlled to produce the confluence of properties and characteristics, mentioned above, that are desired/needed for creating high-density magnetic storage devices, i.e., storage devices that include magnetically recordable layers having 1 Tbit/in$^2$ or greater storage densities.

In this example, FePt—B:X film 204 has been grown on a substrate 220 that includes a texturing material 224 that promotes $L1_0$ ordering of the FePt in the FePt:X film. Examples of materials suitable for texturing material 224 include, but are not limited to MgO, TiN, Ag, Pt, CrRu, CrMo, and RuAl, among others. Further details of texturing material 224, the providing of same, and the depositing of FePt on such material are not required, as these are known in the art. Substrate 220 may also include a wafer, such as a silicon wafer, glass or aluminum disk, or other structure, as needed, to support texturing material 224. Grains 212 of the FePt are oriented perpendicularly in a columnar fashion relative to the surface 228 of substrate 220 so as to create the perpendicular recording structure of FePt:X film 204. It is noted that while grains 212 in this example are columnar, they need not be columnar to provide the functionality required. FePt:X film 204 may have any suitable thickness, such as from about 0.2 nm to about 20 nm, and can be formed using any suitable processing techniques. When FePt:X film 204 is made using sputtering techniques, it can be formed by sequentially depositing multiple sublayers of the differing materials used, by co-sputtering the materials simultaneously, by sputtering from a composite target, or by any suitable combination of these. As an example of sequential sputtering, when FePt:X film 204 contains essentially only FePt and boron, 10 separate sublayers of each can be formed by alternately sputtering the FePt and the boron, for a total of 20 sublayers.

As mentioned above, desirable average sizes of grains 212 of the FePt in FePt:X layer 204 are from about 2 nm to about 10 nm, and average center-to-center distances from grain to grain are desirable to be on the order of about 3 nm to about 12 nm. Intergranular regions 216 provide, among other things, magnetic isolation between immediately adjacent grains and are where the segregant(s) and any other additional materials largely reside. Examples of materials that may be beneficial to add to FePt:X layer 204 to affect grain size, ordering, and/or magnetic isolation include B, Ag, C, SiOx, and TaOx, among others. When boron is used as a segregant, the present inventors have found that the amount of boron present in FePt:X film 204 can affect the size and ordering of grains 208. Generally, a range of volumetric content of boron, relative to the film, of about 5% to about 40%, provides desirable results, while boron content of about 5% to about 15% appears to produce the most desirable results for grain size and ordering.

Figure 3:
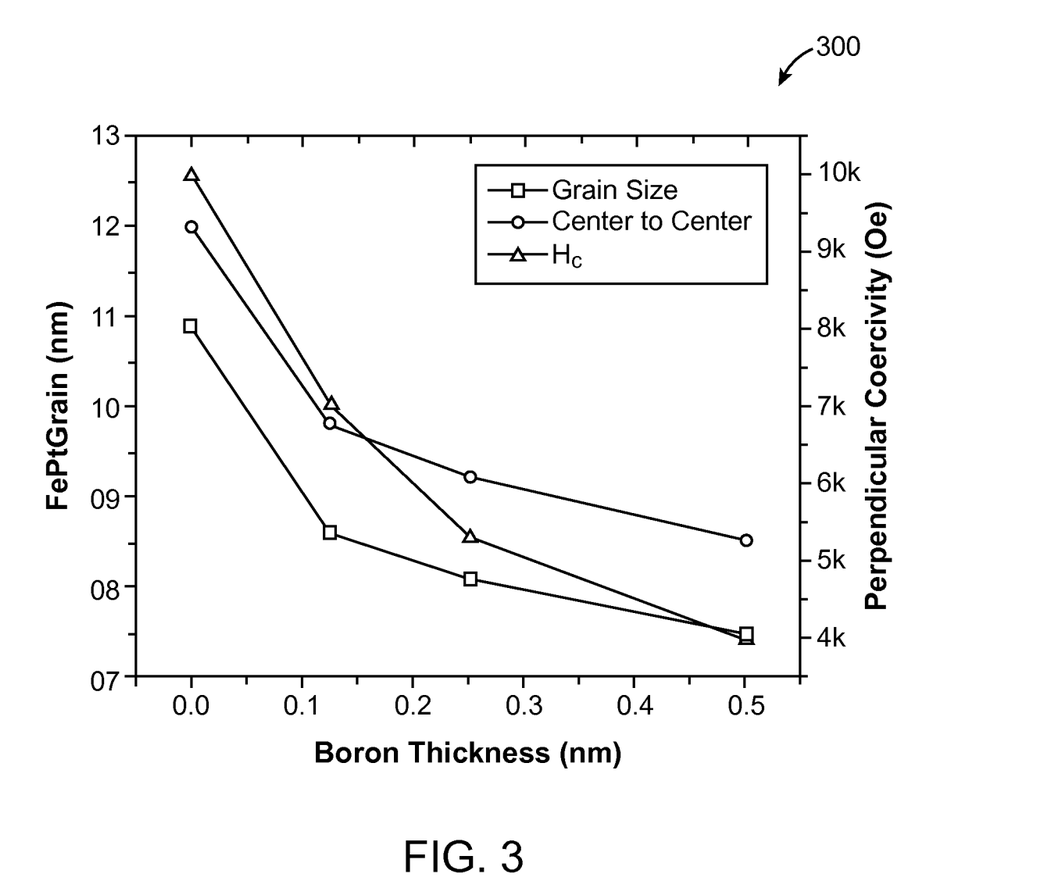
FIG. 3 is a graph of grain size, center-to-center distances, and perpendicular coercivity dependence on boron underlayer thickness.

As mentioned, underlayer 208 can be any material that promotes the formation of grains 212 in suitably small sizes and with regular ordering. Examples of such material include boron and carbon. The present inventors have found that underlayer 208 can be very effective in promoting desirable grain formation in very small amounts, such as thicknesses that are a fraction of a monolayer in thickness (such as 1.25 angstroms). In some cases, the amounts of the grain-size controlling material in underlayer 208 are so small that the material does not form a continuous layer on surface 228 of substrate 220. Consequently, while the term "underlayer" is used to denote the location of the grain-size controlling material(s) in its order of application to substrate, i.e., its application before the formation of FePt:X film 204 begins, it should be understood that this underlayer, as it is referred to herein and in the appended claims, does not need to be a continuous layer of such material(s). Rather, all that the term "underlayer" requires is the presence of one or more grain-size controlling materials applied to substrate 220 prior to depositing FePt:X film 204, regardless of whether a continuous layer of such material(s) is formed or not. The present inventors have found that in the case of using boron as underlayer 208, a thickness in the range of >0 to 2 nm provided desirable results. The same finding was also obtained for carbon. Experiments revealed that using boron as an underlayer for FePt:Ta$_2$O$_5$ (80%/20% volume ratio) resulted in a 2 nm to 4 nm reduction in the average size of grains 212. FIG. 3 is a graph 300 of grain size, center-to-center distance, and perpendicular coercivity dependence on boron underlayer thickness for the FePt:Ta$_2$O$_5$ example just mentioned.

It is noted that when selecting various materials to introduce into an FePt-based magnetically recordable film to isolate and reduce the grain size, it is desirable, though not essential, that four criteria be met. First, the material should not react with or dissolve in FePt during the high temperature processing of the thin film. Second, the segregant should diffuse to the grain boundaries of the FePt grains. This segregation magnetically decouples the grains and reduces the grain size. Third, the segregant should be in the amorphous phase in the temperature range during processing. If the material is crystalline, it will severely degrade the perpendicular texture of the $L1_0$ (001) FePt. Fourth, the segregant should not be corrosive, radioactive, or hazardous. The segregant should be corrosion resistant and not degrade the magnetic properties of the FePt-based films during the lifespan of the recording system. When applied, these four criteria for the segregants can limit the materials available to use in the FePt-based layers.

EXPERIMENTAL EXAMPLES

FePt:B:X Experiments

The present inventors prepared a number of samples of FePt—B and FePt—B—Ag thin films to demonstrate the efficacy of boron-containing $L1_0$-ordered FePt for high density magnetic storage medium applications. The prepared FePt—B and FePt—B—Ag thin films were prepared as multilayers by RF sputtering onto 1-inch diameter silicon substrates with native oxide in a custom built 5-target multilayer sputtering system with a base pressure below $4\times10^{-7}$ torr. Three 5-inch diameter targets were used: MgO (99.99% purity); Ag (99.99% purity); Fe52.5Pt47.5 (99.99% purity); along with one 3-inch diameter boron target (99.99% purity). The MgO texture layer (002) was deposited at 25 mtorr, 200 watts, and at room temperature. A substrate heater was allowed to ramp and held at the desired temperature for 30 minutes before the FePt:X later was deposited. The FePt:X layer was deposited at varying in-situ heating temperatures in a range of 425° C. to 575° C., varying Ar pressures of 10 mtorr to 40 mtorr, and varying sputtering powers of 25 watts to 200 watts. Varying the sputtering time with multilayers was used to control the composition of the resulting FePt:X thin films.

After deposition, the substrate heater was shut off, and the sample was cooled for 2+ hours to room temperature in the sputtering chamber before being vented to atmosphere and removed. The texture of the granular films was examined by X-ray diffraction using Cu—$K_\alpha$ radiation from a Philips X'Pert Pro diffractometer and the relative order parameter was calculated. The microstructure was examined by transmission electron microscopy using a JEOL 2000EX. Standard microscopy thinning methods (polishing, dimpling, and ion milling) were used on all samples and no post-annealing was performed. The volume composition of the resulting films was by X-ray reflectivity on the Philips X'Pert via thickness measurements. The magnetic properties were measured at room temperature by using a Princeton alternating gradient force magnetometer, Quantum Design SPMS SQUID or Quantum Design physical properties measurement system.

Results

Figure 4:
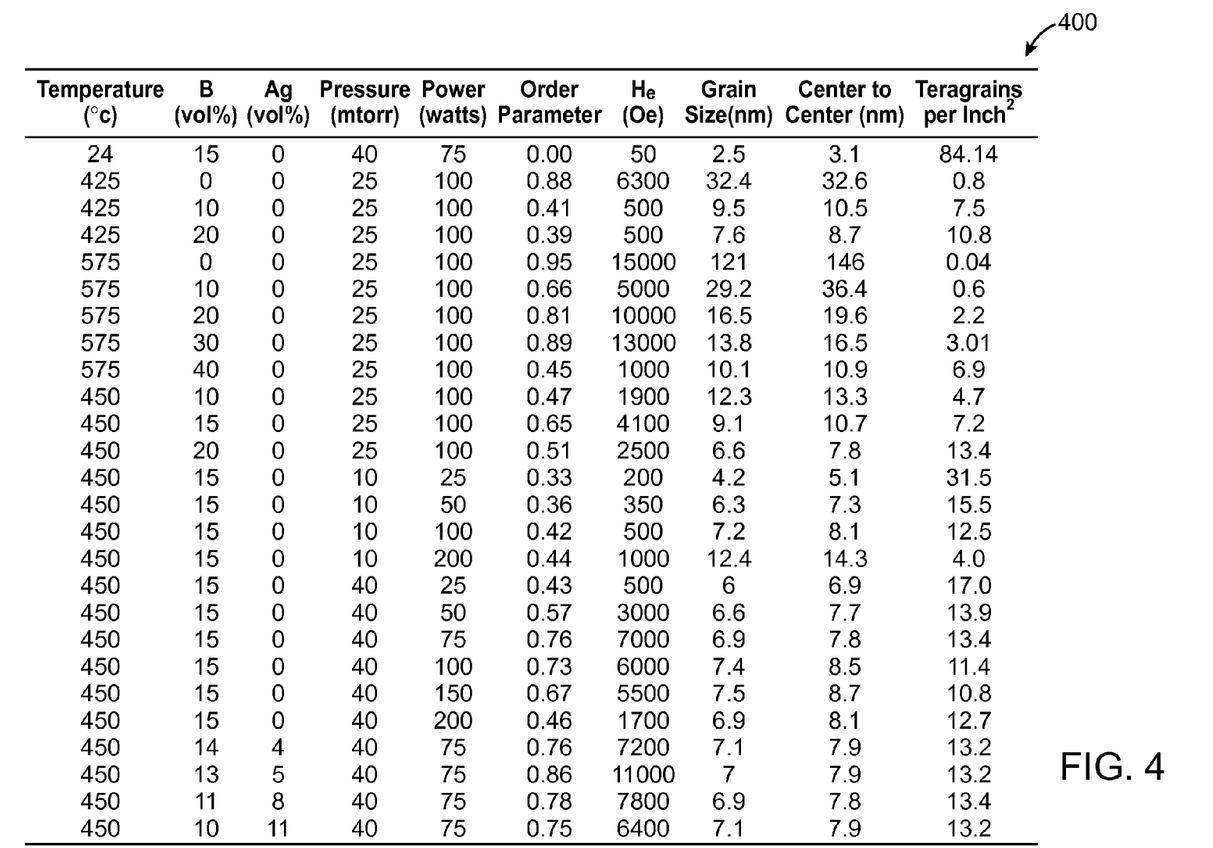
FIG. 4 is a table of experimental results for experiments conducted specifically on FePt-based magnetic storage films containing boron.

The dependence of the microstructure on the volume content of boron of the FePt—B layer was investigated by varying the deposition time of the boron in the multilayers. We observed that introducing boron into the FePt reduced the grain size and promoted columnar growth as evidenced by Table 400 of FIG. 4. The boron acted as a segregant and diffused to the intergranular regions but made ordering more difficult in the FePt as the boron volume content increased. To optimize the ordering and microstructure of the FePt—B, the deposition temperature (425° C. to 575° C.) and the boron content (10% to 40%) were varied. It was observed that at 450° C. and 15% boron volume content, the most uniform, highly ordered small grains of FePt were obtained. The dependence of the relative order parameter S, average grain size, average center-to-center grain spacing, grain densities, and magnetic properties were measured and calculated as seen in Table 400. At lower temperatures (425° C. to 500° C.), the FePt grains were well isolated by boron. At higher temperatures (425° C. to 575° C.), the microstructure degraded due to coalescence of the grains of the FePt.

The dependencies of microstructure and magnetic properties as a function of pressure (10 mtorr to 40 mtorr) and sputtering power (25 watts to 200 watts) were investigated at FePt:B (85%:15% by volume) and 450° C. At both low and high pressure the FePt grains were well isolated by the boron diffusing to the intergranular regions. At low pressure (10 mtorr), the grain size was reduced due to uniform grain isolation compared with at high pressure (40 mtorr). The ordering of the FePt—B was significantly higher at high pressure than at low pressure as seen in Table 400. As the pressure was increased from 10 mtorr to 40 mtorr, while sputtering at 100 watts, an increase in coercivity from 500 Oe to 6 k Oe was observed. At low power (25 watts), the FePt grains were uniform and well isolated by the boron. As power increased, the isolation and uniformity of the FePt grains degraded until the films were almost continuous with small boron-rich regions. The grain size also increased as power increased. The ordering of the FePt—B was significantly higher in the sputtering power region of 75 watts to 150 watts at 40 mtorr as seen in Table 400 of FIG. 4.

The dependence of the magnetic properties of the FePt—B—Ag on the volume of silver content (0% to 11%) was investigated. To increase the ordering of the FePt—B thin films, a thin layer of silver was added halfway through the deposition of the multilayers. The silver volume content was controlled by varying the deposition time of the silver. By adding small amounts of silver (5% by volume) into the FePt—B thin films, the ordering was significantly improved, as determined by X-ray diffraction, and an increase in coercivity was observed, as seen in Table 400 of FIG. 4. The silver did not significantly impact the FePt—B microstructure of the resulting films. At higher volume content (11%), the silver precipitated out of the FePt—B on top of the grains.

While sputtering boron with FePt, the present inventors observed three surprising properties. First, when boron is sputtered with FePt, the FePt—B unexpectedly had significantly smaller grains than FePt—C at low segregant content (e.g., about 10% to 20% by volume). At 15% boron volume content, grain sizes obtained were below 10 nm, whereas carbon requires 30% to 50% volume content. If thickness is fixed, this should lead to FePt—B films with higher Ms than FePt—C. Second, boron unexpectedly promoted denser nucleation and layer-by-layer growth in FePt, even at high temperature (575° C.). Third, the FePt—B films unexpectedly remained columnar beyond 10 nm thickness, unlike FePt—C, which can easily break up into secondary growth layers. At volume content of about 30%, boron significantly reduces the ordering of FePt at a given temperature. Therefore, at least at the experimental conditions used in our experiments, there is a tradeoff to using boron as a segregant since large volume content (e.g., 40% or greater) may lead to uniform grains, but poor ordering. On the other hand, boron in small quantities (e.g., 5% to 15% by volume) has a small impact upon the ordering, but promotes columnar microstructure and reduces the grain size distribution in the FePt.

Substrate temperature also appears to be an important variable in determining the morphology and magnetic properties of the FePt—B layer, since small changes in temperature result in large changes in both microstructure and magnetic properties. Below 450° C., observations revealed small, well-isolated grains that were uniform in size, but have no significant order. Above 500° C., observations revealed significant ordering in the FePt—B, but the microstructure decayed due to coalescence because the grains grew at the expense of one another. The FePt—B films deposited at room temperature had the best microstructure. This agrees with theory, since increasing the substrate temperature increases the atom's surface mobility, which promotes island growth, whereas at lower substrate temperatures the surface mobility decreases and results in an increase in the density of the grain nuclei.

During the experimental process of depositing the FePt—B films, the working pressure of the argon affected the microstructure and magnetic properties of the films. As the pressure increased from 10 mtorr to 40 mtorr at constant sputtering power and substrate temperature, the microstructure became less uniform, but the ordering increased. The grain size at 50 watts increased from 6.3 nm at 10 mtorr to 6.6 nm at 40 mtorr. Likewise, the center-to-center grain size increased from 7.3 nm at 10 mtorr to 7.7 nm at 40 mtorr. The perpendicular coercivity at 50 watts increased from 350 Oe to 3 kOe at 40 mtorr.

During the experimental process of depositing the FePt—B films, the sputtering power affected the microstructure and magnetic properties of the films. As the power was increased from 25 watts to 200 watts, the microstructure became less uniform. The ordering increased from 25 watts until 75 watts and then slowly decreased, as evidenced by the data in Table 400 of FIG. 4.

In the experiments, the smallest (2.5 nm) and best isolated FePt grains were observed in the films deposited at room temperature, 75-watt sputtering, and 40 mtorr pressure, but these films had low coercivity of 50 Oe. The best ordered and highest coercivity (7 kOe) was observed in the FePt—B films deposited at 450° C. substrate temperature, 75-watt sputtering, and 40 mtorr pressure. However, the grain size increased to 6.9 nm. Thus, under the experimental conditions, there appears to be a tradeoff between the best microstructure and the best magnetic properties.

As mentioned, the experiments investigated adding silver to improve the ordering and magnetic properties. At small volume content (less than 11%), silver significantly improved the ordering of the FePt—B films at a given temperature. The largest increase in ordering of the FePt—B—Ag occurred at 5% volume content of silver. The coercivity increased from 7 kOe to 11 kOe, with no significant impact on the microstructure.

Exemplary Uses

Figure 5:
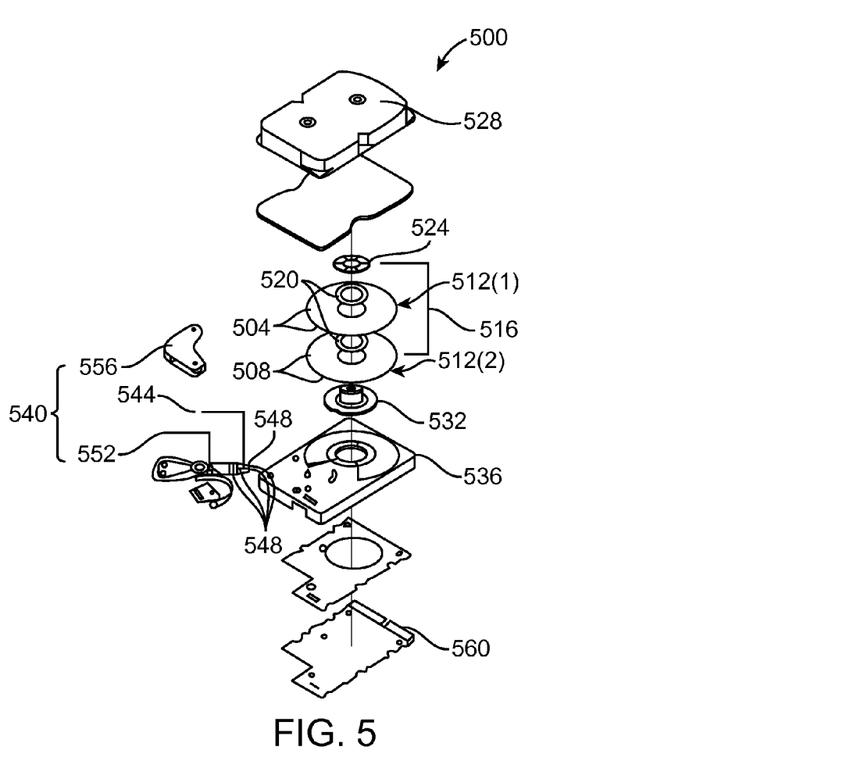
FIG. 5 is an exploded view of a hard-disk drive device made in accordance with the present invention.

FIG. 5 illustrates an information storage device 500, here a hard-disk drive, made in accordance with the present invention. In this example, storage device 500 includes a magnetic storage medium 504, which in the example is embodied as four magnetically recordable media layers 508 contained on two disks 512(1) and 512(2). Importantly, each magnetically recordable media layer 508 is either an FePt:B-based layer or an FePt-based layer formed on an underlayer, or a combination of both, as described above in detail in conjunction with exemplary magnetic storage medium structures 100 and 200 of FIGS. 1A-1B, and 2, respectively. It is noted that each of the four magnetically recordable media layers 508 can be coated with one or more suitable protective coatings applied over the magnetically recordable media layers, although such coating(s) is/are not specifically shown. As discussed above, the composition of magnetically recordable media layers 508 allows them to have a storage density of 1 Tbit/in$^2$ or more, depending on the actual grain size of the FePt.

While magnetic storage medium 504 is a crucial aspect of storage device 500, for the sake of completeness other components of the storage device will now be described. Each disk 512(1) and 512(2) may include a suitable base support structure, such as an aluminum or glass disk. The starting disk may then be coated with one or more suitable texturing materials that provide the starting point for creating magnetically recordable media layers 508 in the manner described above relative to exemplary magnetic storage medium structures 100 and 200 of FIGS. 1A-1B, and 2, respectively. In this example, the base disk can be referred to as a "support," and the combination of the base disk and the texturing material(s) is referred to as the "substrate" for the magnetically recordable media layers.

Disks 512(1) and 512(2) are part of a disk assembly 516 that includes spacers 520 and a rotational bearing 524 that is ultimately supported by a housing component 528. Each disk 512(1) and 512(2) includes a substrate (not shown) that supports magnetically recordable media layers 508 on both sides of the substrate. Disks 512(1) and 512(2) are driven by a DC spindle motor 532 that is secured to a base assembly 536, which also supports a read/write system 540. With two disks 512(1) and 512(2), there are a total of four magnetically recordable media layers 508 in this example. Correspondingly, read/write system 540 includes a head-stack assembly 544 that has four read/write heads 548. Read/write system 540 also includes a read/write preamplifier 552 and a drive unit, here a voice coil assembly 556, for moving the head-stack assembly as needed to perform reading and writing operations. All operations of storage device 500 are controlled via a printed circuit board 560 and electronic components (not shown) onboard the printed circuit board. Those skilled in the art will readily appreciate that this hard-disk drive example is presented merely as a simple example of how a magnetic storage medium of the present invention can be incorporated into a hard-disk drive. Indeed, skilled artisans will certainly understand that many variations of a hard-disk drive can be made using a magnetic storage medium of the present disclosure, such that an exhaustive list and detailed descriptions of alternatives is not necessary for those artisans to practice the present invention to the fullest scope of the appended claims.

Figure 6:
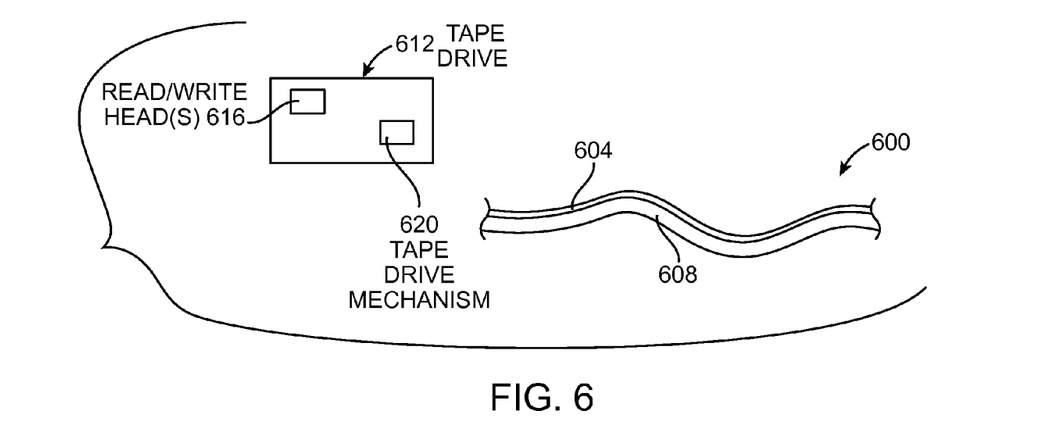
FIG. 6 is a combined cross-sectional view of magnetic recording tape made in accordance with the present invention and high-level box diagram of a tape drive capable of reading from and writing to the magnetic recording tape.
Figure 7:
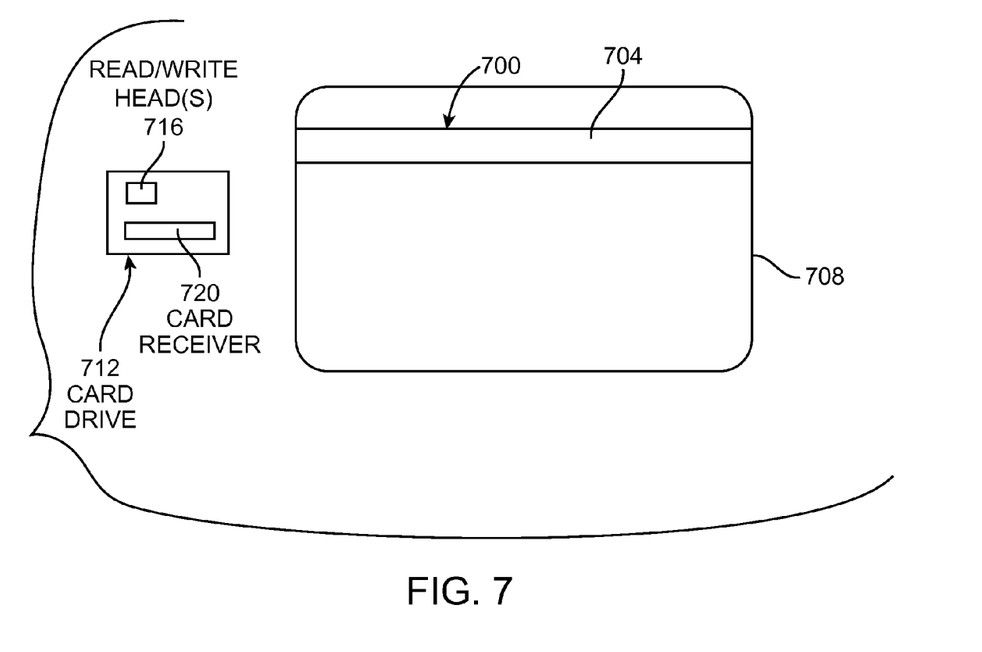
FIG. 7 is a combined plan view of a device that includes a card-based magnetic recording strip made in accordance with the present invention and a high-level box diagram of a card drive capable of reading from and writing to the magnetic recording strip.

It is noted that while in the foregoing hard-disk-drive example magnetic storage medium 504 is embodied on disks 512(1) and 512(2), in other information storage devices that can be made in accordance with the present invention, the magnetic storage medium can be embodied on other structures. For example: in the case of a floppy disk (not shown, but similar to each of disks 512(1) and 512(2)) a magnetic storage medium of the present disclosure can be embodied on a flexible disk; in the case of magnetic recording tape, such as tape 600 of FIG. 6, a magnetic storage medium of the present disclosure can be embodied as one or more magnetically recordable media layers 604 on a suitable tape-based substrate 608; and in the case of a magnetically recorded strip, such as strip 700 of FIG. 7, a magnetic storage medium of the present disclosure can be embodied as a magnetically recordable media layer 704 on a suitable base structure, such as a plastic card 708 (e.g., a credit card, debit card, identification card, etc.); among others. Those skilled in the art will readily appreciate the variety of information storage devices that can include a magnetic storage medium made in accordance with the present invention.

Referring again to FIG. 6, those skilled in the art will understand that tape 608 can be used with a suitable tape drive 612 that includes, among other things, at least one read/write head 616 capable of reading from and writing information to the one or more recordable media layers 604, and a tape drive mechanism 620 designed and configured to move tape 600 relative to the read/write head(s). Similarly, and referring again to FIG. 7, those skilled in the art will understand that card 708 can be used with a suitable card drive 712 that includes, among other things, at least one read/write head 716 capable of reading from and writing information to recordable media layers 704, and a card-receiving region 720 designed and configured to contain the card in the proper position relative to the read/write head(s).

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A magnetic recording medium, comprising:
   a substrate having a surface; and
   a magnetically recordable layer supported by said substrate, said magnetically recordable layer having a coercivity of at least about 5 kOe and including:
      iron-platinum having a granular configuration comprising grains separated by inter-granular regions, wherein said grains:
         have predominantly a $L1_0$ crystal structure;
         have an average grain size of between about 2 nm and about 10 nm in a plane parallel to said surface of said substrate;
         a magnetization orientation substantially perpendicular to said surface of said substrate; and
      boron interspersed among said grains, wherein said boron comprises about 5% to about 40% of said magnetically recordable layer, by volume; and a carbon or boron underlayer, having a thickness of 0<t≤0.2 nm, disposed between said magnetically recordable layer and said substrate so as to be in contact with said iron-platinum, wherein said underlayer comprises a material selected to influence the grain size of the grains of the iron-platinum as said magnetically recordable layer is grown over said underlayer, wherein said magnetically recordable layer further comprises silver interspersed among said grains, wherein said silver comprises up to about 11% of said magnetically recordable layer, by volume.

2. A magnetic recording medium according to claim 1, wherein said magnetically recordable layer has a thickness of about 0.2 nm to about 20 nm.

3. A magnetic recording medium according to claim 1, wherein said boron comprises about 5% to about 15% of said magnetically recordable layer, by volume.

4. A magnetic recording medium according to claim 1, wherein said grain size is less than about 7 nm.

5. A magnetic recording medium according to claim 4, wherein said average grain size is between about 2 nm and about 5 nm.

6. A magnetic recording medium according to claim 1, wherein said material of said underlayer comprises substantially only boron.

7. A magnetic recording medium according to claim 1, wherein said material of said underlayer comprises substantially only carbon.

8. A magnetic recording medium according to claim 1, wherein said substrate has a crystal structure that is substantially lattice-matched with said $L1_0$ crystal structure of said iron-platinum and said magnetically recordable layer is applied to said substrate.

9. An information storage device, comprising:
a substrate comprising a support and having a surface; and
a magnetic storage medium supported by said support and including:
a magnetically recordable layer supported by said substrate, said magnetically recordable layer having a coercivity of at least about 5 kOe and including:
iron-platinum having a granular configuration comprising grains separated by inter-granular regions, wherein said grains:
have a predominantly $L1_0$ crystal structure;
have an average grain size of between about 2 nm and about 10 nm in a plane parallel to said surface of said substrate;
a magnetization orientation substantially perpendicular to said surface of said substrate; and
boron interspersed among said grains, wherein said boron comprises about 5% to about 40% of said magnetically recordable layer, by volume; and
a carbon or boron underlayer, having a thickness of 0<t≤0.2 nm, disposed between said magnetically recordable layer and said substrate so as to be in contact with said iron-platinum, wherein said underlayer comprises a material selected to influence the grain size of the grains of the iron-platinum as said magnetically recordable layer is grown over said underlayer,
wherein said magnetically recordable layer further comprises silver interspersed among said grains, wherein said silver comprises up to about 11% of said magnetically recordable layer, by volume.

10. An information storage device according to claim 9, wherein said support comprises a disk having a pair of opposite sides, and said magnetic storage medium is applied to at least one of said opposite sides.

11. An information storage device according to claim 10, further comprising:
a motor drive operatively coupled to said disk so as to rotate said disk during operation of the information storage device;
at least one read/write head designed and configured to magnetically read information from, and write information to, said magnetically recordable layer during operation of the information storage device; and
a drive unit operatively engaging said at least one read/write head so as to move said at least one read/write head relative to said at least one disk during operation of the information storage device.

12. An information storage device according to claim 9, wherein said support comprises a tape.

13. An information storage device according to claim 12, further comprising:
at least one read/write head designed and configured to magnetically read information from, and write information to, said magnetically recordable layer during operation of the information storage device; and
a tape drive mechanism designed and configured to move said magnetically recordable layer and said tape base relative to said at least one read/write head during operation of the information storage device.

14. An information storage device according to claim 9, wherein said support comprises a card.

15. An information storage device according to claim 14, further comprising:
at least one read/write head designed and configured to magnetically read information from, and write information to, said magnetically recordable layer during operation of the information storage device; and
a card receiver designed and configured to contain said card relative to said at least one read/write head during operation of the information storage device.

16. An information storage device according to claim 9, wherein said magnetically recordable layer has a thickness of about 0.2 nm to about 20 nm.

17. An information storage device according to claim 9, wherein said boron comprises about 5% to about 15% of said magnetically recordable layer, by volume.

18. An information storage device according to claim 9, wherein said average grain size is between about 2 nm and about 7 nm.

19. An information storage device according to claim 18, wherein said average grain size is between about 2 nm about 5 nm.

20. An information storage device according to claim 9, wherein said material of said underlayer is comprised substantially of boron.

21. An information storage device according to claim 9, wherein said material of said underlayer is comprised substantially of carbon.

22. An information storage device according to claim 9, wherein said substrate has a crystal structure that is substantially lattice-matched with said $L1_0$ crystal structure of said iron-platinum and said magnetically recordable layer is applied to said substrate.

23. A magnetic recording medium, comprising:
a substrate having a surface; and
a magnetically recordable layer supported by said substrate, said magnetically recordable layer having a coercivity of at least 5 kOe and including:

iron-platinum having a granular configuration comprising grains separated by inter-granular regions, wherein said grains:
have predominantly a $L1_0$ crystal structure;
have an average grain size of between 2 nm and 10 nm in a plane parallel to said surface of said substrate;
a magnetization orientation substantially perpendicular to said surface of said substrate; and
boron interspersed among said grains, wherein said boron comprises 5% to 40% of said magnetically recordable layer, by volume; and
a carbon or boron underlayer, having a thickness of 0<t≤0.2 nm, disposed between said magnetically recordable layer and said substrate so as to be in contact with said iron-platinum, wherein said underlayer comprises a material selected to influence the grain size of the grains of the iron-platinum as said magnetically recordable layer is grown over said underlayer,
wherein said magnetically recordable layer further comprises silver interspersed among said grains, wherein said silver comprises up to 11% of said magnetically recordable layer, by volume.

24. A magnetic recording medium according to claim 23, wherein said magnetically recordable layer has a thickness of 0.2 nm to 20 nm.

25. A magnetic recording medium according to claim 23, wherein said boron comprises 5% to 15% of said magnetically recordable layer, by volume.

26. A magnetic recording medium according to claim 23, wherein said grain size is less than 7 nm.

27. A magnetic recording medium according to claim 26, wherein said average grain size is between 2 nm and 5 nm.

28. A magnetic recording medium according to claim 23, wherein said material of said underlayer comprises substantially only boron.

29. A magnetic recording medium according to claim 23, wherein said material of said underlayer comprises substantially only carbon.

30. A magnetic recording medium according to claim 23, wherein said substrate has a crystal structure that is substantially lattice-matched with said $L1_0$ crystal structure of said iron-platinum and said magnetically recordable layer is applied to said substrate.

31. An information storage device, comprising:
a substrate comprising a support and having a surface; and
a magnetic storage medium supported by said support and including:
a magnetically recordable layer supported by said substrate, said magnetically recordable layer having a coercivity of at least 5 kOe and including:
iron-platinum having a granular configuration comprising grains separated by inter-granular regions, wherein said grains:
have a predominantly $L1_0$ crystal structure;
have an average grain size of between 2 nm and 10 nm in a plane parallel to said surface of said substrate;
a magnetization orientation substantially perpendicular to said surface of said substrate; and
boron interspersed among said grains, wherein said boron comprises 5% to 40% of said magnetically recordable layer, by volume; and
a carbon or boron underlayer, having a thickness of 0<t≤0.2 nm, disposed between said magnetically recordable layer and said substrate so as to be in contact with said iron-platinum, wherein said underlayer comprises a material selected to influence the grain size of the grains of the iron-platinum as said magnetically recordable layer is grown over said underlayer,
wherein said magnetically recordable layer further comprises silver interspersed among said grains, wherein said silver comprises up to 11% of said magnetically recordable layer, by volume.

32. An information storage device according to claim 31, wherein said support comprises a disk having a pair of opposite sides, and said magnetic storage medium is applied to at least one of said opposite sides.

33. An information storage device according to claim 32, further comprising:
a motor drive operatively coupled to said disk so as to rotate said disk during operation of the information storage device;
at least one read/write head designed and configured to magnetically read information from, and write information to, said magnetically recordable layer during operation of the information storage device; and
a drive unit operatively engaging said at least one read/write head so as to move said at least one read/write head relative to said at least one disk during operation of the information storage device.

34. An information storage device according to claim 31, wherein said support comprises a tape.

35. An information storage device according to claim 34, further comprising:
at least one read/write head designed and configured to magnetically read information from, and write information to, said magnetically recordable layer during operation of the information storage device; and
a tape drive mechanism designed and configured to move said magnetically recordable layer and said tape base relative to said at least one read/write head during operation of the information storage device.

36. An information storage device according to claim 31, wherein said support comprises a card.

37. An information storage device according to claim 36, further comprising:
at least one read/write head designed and configured to magnetically read information from, and write information to, said magnetically recordable layer during operation of the information storage device; and
a card receiver designed and configured to contain said card relative to said at least one read/write head during operation of the information storage device.

38. An information storage device according to claim 31, wherein said magnetically recordable layer has a thickness of 0.2 nm to 20 nm.

39. An information storage device according to claim 31, wherein said boron comprises 5% to 15% of said magnetically recordable layer, by volume.

40. An information storage device according to claim 31, wherein said average grain size is between 2 nm and 7 nm.

41. An information storage device according to claim 40, wherein said average grain size is between 2 nm 5 nm.

42. An information storage device according to claim 31, wherein said material of said underlayer is comprised substantially of boron.

43. An information storage device according to claim 31, wherein said material of said underlayer is comprised substantially of carbon.

44. An information storage device according to claim 31, wherein said substrate has a crystal structure that is substantially lattice-matched with said $L1_0$ crystal structure of said iron-platinum and said magnetically recordable layer is applied to said substrate.

* * * * *